United States Patent [19]

Hershberger

[11] Patent Number: 4,859,841
[45] Date of Patent: Aug. 22, 1989

[54] DIGITAL DATA APPARATUS INCLUDING AN APPLICATION INSERT SENSOR

[75] Inventor: Marc Hershberger, Rochester, N.Y.

[73] Assignee: Eastman Kodak Company, Rochester, N.Y.

[21] Appl. No.: 138,467

[22] Filed: Dec. 28, 1987

[51] Int. Cl.⁴ ............... G06K 13/063; G06K 13/067; G06K 13/24
[52] U.S. Cl. .................... 235/485; 235/456; 235/486
[58] Field of Search ............. 235/454, 456, 483, 485, 235/486

[56] References Cited

U.S. PATENT DOCUMENTS

| 2,670,954 | 3/1954 | Bach | 271/57 |
| 2,729,810 | 1/1956 | Coffey | 340/259 |
| 2,802,598 | 8/1957 | Petterson | 221/13 |
| 2,987,591 | 6/1961 | Örtenblad | 200/61.41 |
| 3,158,317 | 11/1964 | Alexander | 235/145 |
| 3,158,369 | 11/1964 | Blenner et al. | 271/57 |
| 3,176,981 | 4/1965 | Vandeman | 271/57 |
| 3,560,964 | 2/1971 | Bedell et al. | 340/365 |
| 3,624,360 | 11/1971 | Farnworth et al. | 235/483 X |
| 3,886,592 | 5/1975 | Kato et al. | 360/75 |
| 4,119,839 | 10/1978 | Beckmann et al. | 235/145 R |
| 4,279,021 | 7/1981 | See et al. | 364/900 |
| 4,439,757 | 3/1984 | Gross et al. | 340/365 |
| 4,631,700 | 12/1986 | Lapeyre | 364/900 |
| 4,692,603 | 9/1987 | Brass et al. | 235/454 |
| 4,743,746 | 5/1988 | Marschall et al. | 235/485 X |

Primary Examiner—David L. Trafton
Attorney, Agent, or Firm—William F. Noval

[57] ABSTRACT

Digital data apparatus includes a reader for reading digital data encoded on a datastrip on an application insert. Disclosed is a sensor for sensing whether or not an application insert is positioned for reading by the reader. The digital data apparatus includes a platen upon which an insert is positioned and which is accessible through a door. An end of the platen is located adjacent to the door. Opening the door moves the end of the platen so that an application insert can be positioned on the platen. Closing the door allows the platen to press the insert towards the reader to facilitate reading digital data on a datastrip of the insert. The sensor is a microswitch, mounted on the platen. The microswitch has an actuator which is engageable by an application insert positioned on the platen. The microswitch is only actuated when the door is closed and an application insert is positioned on the platen.

3 Claims, 10 Drawing Sheets

DIGITAL DATA APPARATUS INCLUDING AN APPLICATION INSERT SENSOR

BACKGROUND OF THE INVENTION

This invention relates generally to digital data apparatus and more particularly to digital data apparatus having a reader for reading digital data encoded on datastrips contained on an application insert.

Microprocessor controlled equipment utilizing digital data have become commonplace in industry, in business and in the home. In some equipment (such as the microwave oven, or other consumer appliances), programming of the microprocessor is dedicated to the specific control of the equipment. Thus, the microprocessor is not independently programmable by the equipment user. In other equipment (such as home or personal computers), the microprocessor is the heart of a digital data system which may be independently programmed by the user. Thus, programs for applications such as word processing, database management, file management and financial management are readily available for use in personal computers. Morever, thousands of other programs are available for a wide variety of financial, educational, personal enrichment and entertainment applications.

Major obstacles to the wider acceptability of user programmable digital data apparatus have been the skill and time required to learn to use such apparatus. Moreover, available software often is expensive (costing several hundred dollars or more), and requires considerable time and effort to master the terminology and routines presented in the software. Typically, the home or personal computer includes a floppy disc drive. The software to be utilized in the computer is encoded on a floppy disc which is inserted into the floppy disc drive of the computer. Although versatile, such a programming system is expensive and requires skill to implement.

Other systems have been proposed for making microprocessor controlled apparatus more flexible and capable of performing a variety of functions through the use of interchangeable keyboard overlays, digital cartridges and the like. Thus, for example, U.S. Pat. No. 4,439,757 discloses a computer interactive device including a planar keyboard and a display panel. A resilient keyboard overlay defining a specific key applications may be inserted over the planar keyboard, and a program entered into the device by means of a separate cartridge. A similar technique is disclosed un U.S. Pat. No. 4,119,839, entitled KEYBOARD MASK FOR A GENERAL PURPOSE CALCULATOR, issued Oct. 10, 1978. Such systems are disadvantageous because, by separating the keyboard overlay from the data cartridge, one or the other may be lost, rendering the system useless. Moreover, the data cartridges or cassettes are expensive.

Another system which has been proposed for increasing the versatility of digital data apparatus is to provide a dedicated keyboard with a limited number of keys, but to store within the apparatus, software programming for different functions for each key relating to several different applications. Interchangeable keyboard overlays are then placed over the keyboard to provide visual indicia of the functions of the keys for a specific application. The keyboard overlays may also include machine readable codes to identify the specific application represented by the overlay. These systems are disadvantageous in the cost and size of memory needed to stored all of the programs. Moreover, the stored programs are not easily modified by a user. Such systems are disclosed, for example, in U.S. Pat. No. 3,158,317 entitled CONTROL DEVICE, issued Nov. 24, 1964; U.S. Pat. No. 3,560,964 entitled KEYBOARD UNIT, issued Feb. 2, 1971; and U.S. Pat. No. 4,279,021 entitled PORTABLE DATA ENTRY APPARATUS INCLUDING PLURAL SELECTABLE FUNCTIONAL CONFIGURATIONS, issued July 14, 1981.

Another programming system is disclosed in U.S. Pat. No. 4,631,700, entitled MAGNETICALLY CODED SOFTWARE FOR MULTIPURPOSE COMPUTER, issued Dec. 23, 1986, filed Aug. 11, 1983. As disclosed in this patent, a computer keyboard matrix overlay panel includes both indicia indicating the function of keys and other operating instructions, and magnetic and optical datastrips along the edges of the overlay. As disclosed in FIG. 2 of this patent, the computer includes a reader 25 having a slot 24 for reading the datastrips when the overlay panel is inserted in an edgewise fashion into the reader slot. Once the datastrips have been read into the computer, the overlay is placed over the keys to provide a visual indication of the function of keys. The systems disclosed by this patent are disadvantageous in requiring the user to sequentially insert, each of the edges of the overlay panel containing a code strip, into the slotted reader before the panel is registered with the keys on the computer. Moreover, the edges of the panel may be damaged, resulting in loss of data.

SUMMARY OF THE INVENTION

According to the present invention, there is provided digital data apparatus having a reader for reading digital data encoded on one or more datastrips contained on an application insert. The apparatus includes a sensor for sensing whether or not an application insert is positioned for reading by the reader. The application insert is positioned on a platen which is disposed below the reader and which is accessible through a door. The sensor is mounted on the platen and engageable by an application insert. According to an aspect of the invention, the sensor is only actuated when the door is closed and an application insert is positioned on the platen to be read by the reader. Thus, operation of the reader is inhibited when the door is open and an insert is being positioned on the platen, as well as when no insert is positioned on the platen.

DESCRIPTION OF THE DRAWINGS

The invention will be described in detail with reference to the drawings in which like elements are provided with like numbers.

DESCRIPTION OF THE PREFERRED EMBODIMENT

The present invention will be described with respect to a digital data apparatus which is intended to be an information appliance for the consumer market. It will be understood that the present invention may also be used with other digital data apparatus. In general, the information appliance described below includes a microprocessor and memory for storing software relating to operating system routines and built-in application routines. The appliance can also process a wide variety of customized software applications which are provided on application inserts which have an application program in machine readable digitally encoded datastrips. The application insert also includes a touchpad to interface the user with the software application. The datastrips include a structured pattern of black and white adjacent rectangles which are encoded with the application software and which are read by means of mechanical or electronic, optical scanning devices. It will be understood, however, that other optical and magnetic digital data formats may be used with the present invention.

Figure 1:
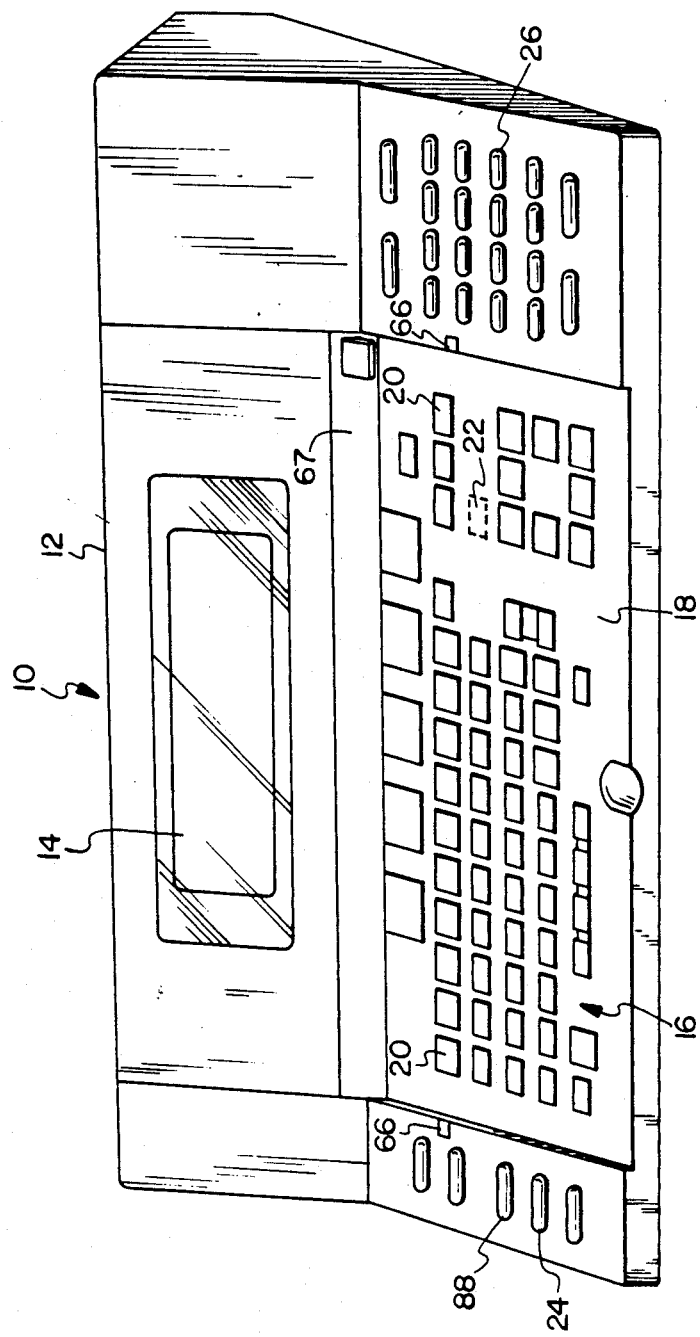
FIG. 1 is a perspective view of digital data apparatus in which an embodiment of the present invention is incorporated.

Referring now to the Figures, there will be described a preferred embodiment of the present invention. As shown in FIG. 1, a digital data apparatus such as information appliance 10, includes a housing 12 having a liquid crystal display 14. A membrane touchpad 16 disposed in a recess 18 in housing 12. Touchpad 16 includes an array of touch sensitive keys 20 and touch sensitive positions 22 which may be configured into an application specific touchpad when an application insert is placed over touchpad 16. Keys 20 are visually marked with a full typewriter keyboard and with other keys to access and use software applications built into appliance 10. Appliance 10 is also provided with control keys 24 and arithmetic keys 26.

Figure 2:
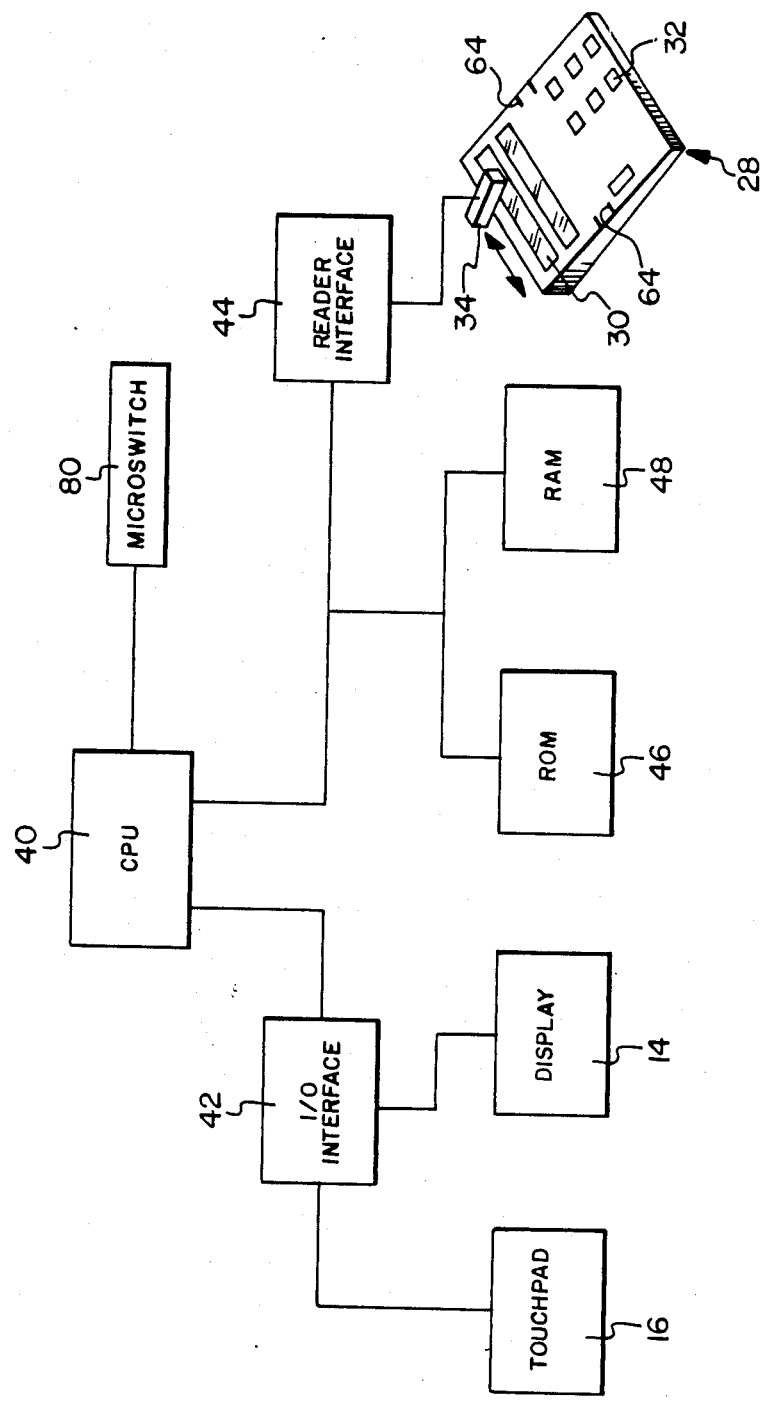
FIG. 2 is a block schematic diagram useful in describing the operation of the apparatus of FIG. 1.
Figure 5A:
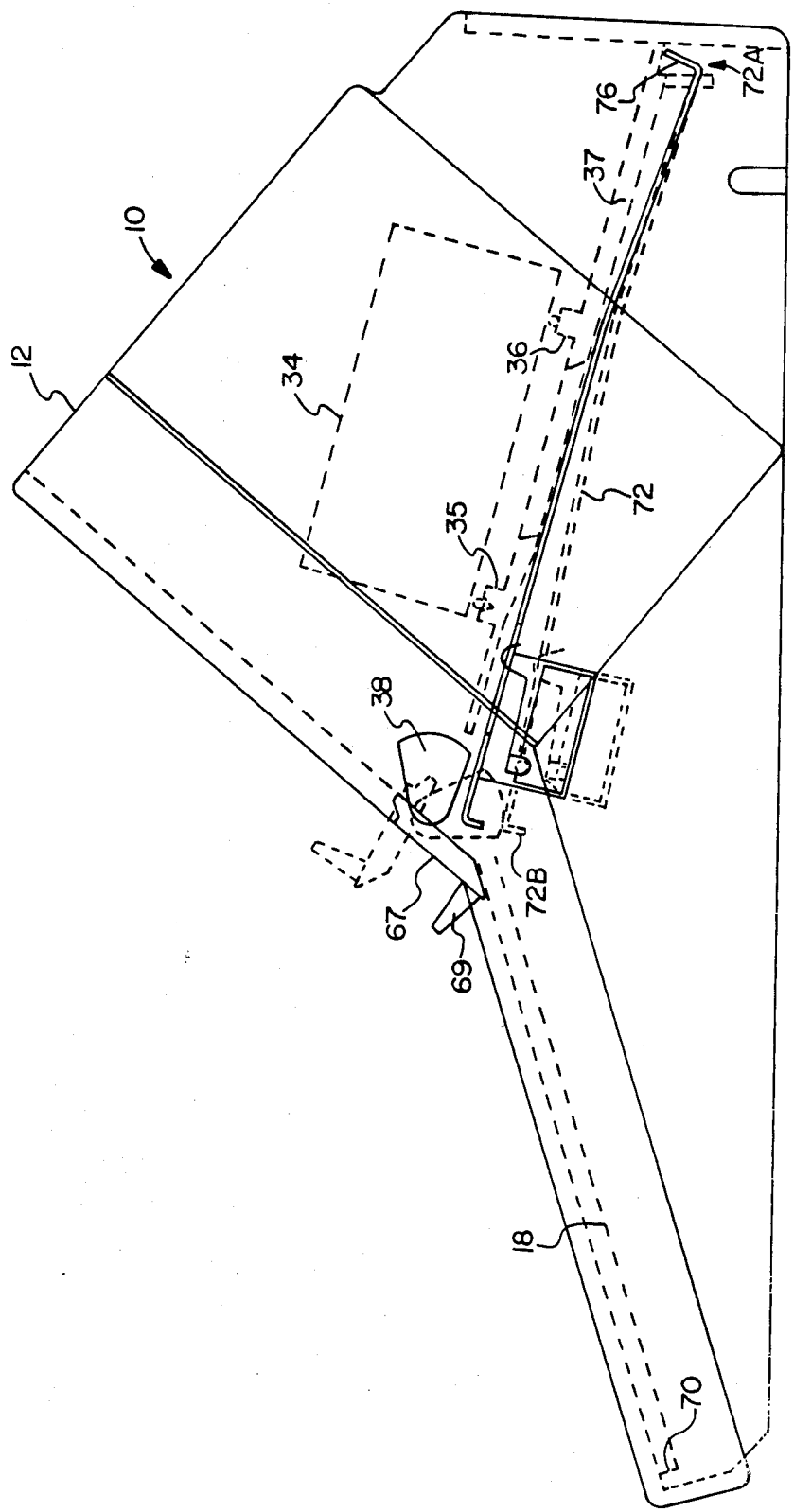
FIGS. 5A and 5B are diagrammatic, elevational and plan views illustrating components including an embodiment of the present invention incorporated in the apparatus of FIG. 1.

An application insert 28 (FIG. 2) contains one or more datastrips 30 having digital data encoded in machine readable format. Insert 28 also has an overlay touchpad 32 having keys which overlay touch sensitive positions on touchpad 16 of appliance 10. Appliance 10 includes a datastrip reader 34 which is mounted for reciprocal movement on tracks 35 and 36 on fixed member 37 (FIG. 5A). A pressure platen 72 is located below member 37 and is cantilevered at end 72A to bracket 39. End 72B of platen 72 is movable between open and closed position by means of cam 38 on door 67. When door 67 is opened (by pushing up on lever 69), end 72B is cammed down by cam 38 (as shown in dashed lines in FIG. 5A). An application insert 28 may now be placed on platen 72, to position a datastrip relative to reader 34. When door 67 is closed (by pushing down on lever 69), cam 38 is raised, allowing platen 72 to press the insert 28 against member 37 so that a datastrip is in the field of focus of reader 34.

Reader 34 can be a mechanical-optical reader which optically scans a datastrip and translates its contents into an 8-bit digitally coded signal which is stored in memory in appliance 10. (It will be understood that reader 34 may also be an electronic optical reader which includes an array of photodiodes or a CCD sensor). Datastrips 30 may also be in the form of magnetic media, in which case, the reader 34 can be any well known type of magnetic scanning device.

The digital data processing system (FIG. 2) of appliance 10 includes a microprocessor central processing unit (CPU) 40 which is connected to touchpad 16 and display 14 by input/output (I/O) interface circuit 42. CPU 40 is also connected to read only memory (ROM) 46; random access memory (RAM) 48 and datastrip reader 34 through reader interface 44. ROM 46 contains software programs (1) relating to the operating system for the microprocessor (CPU 40) and (2) relating to application functions which are built into appliance 10. Ram 48 has sufficient memory for storing applications and data read from application inserts 28 as well as data associated with the programs stored in ROM 46.

Figure 3A:
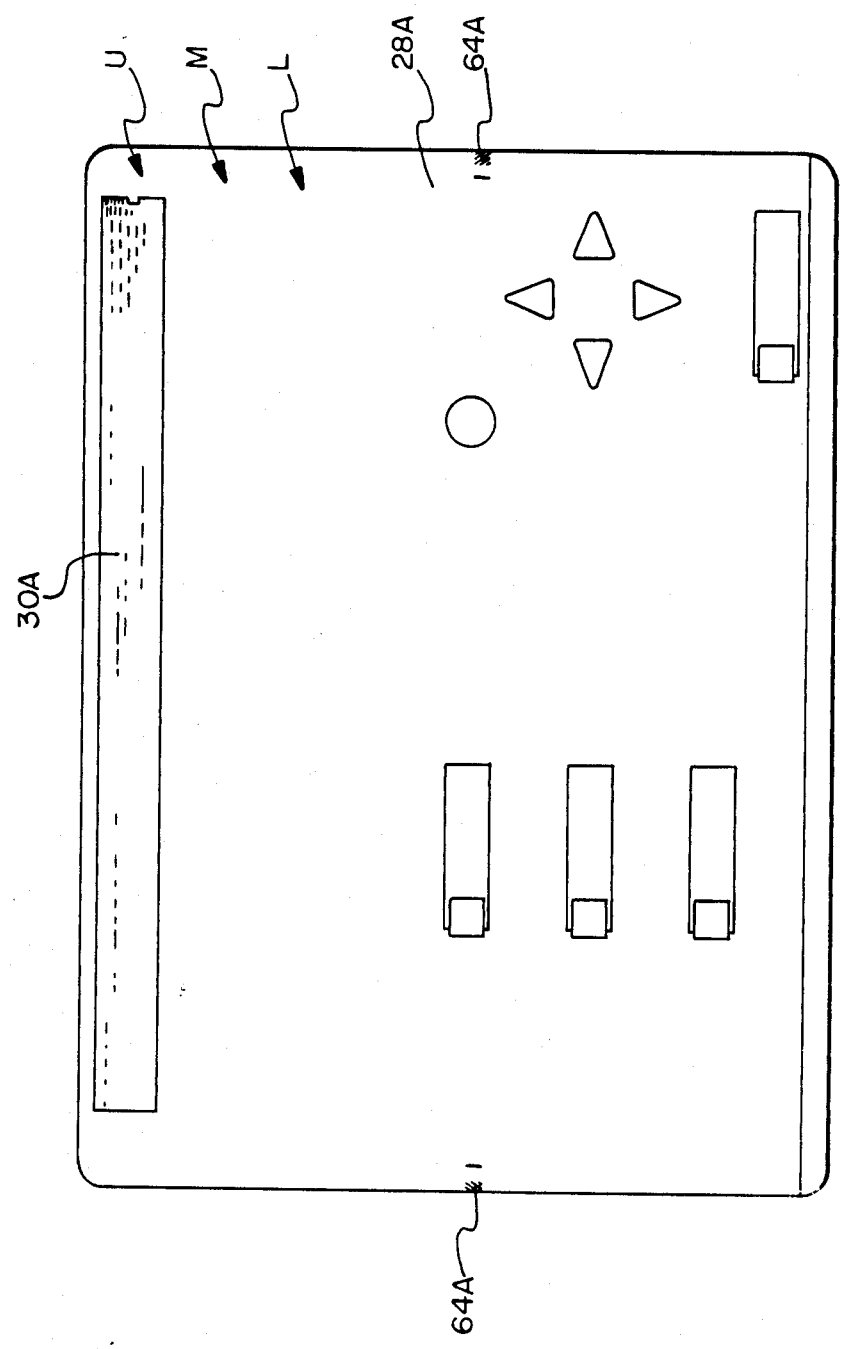
FIGS. 3A, 3B and 3C are plan views of application inserts to be used with the apparatus of FIG. 1.
Figure 3B:
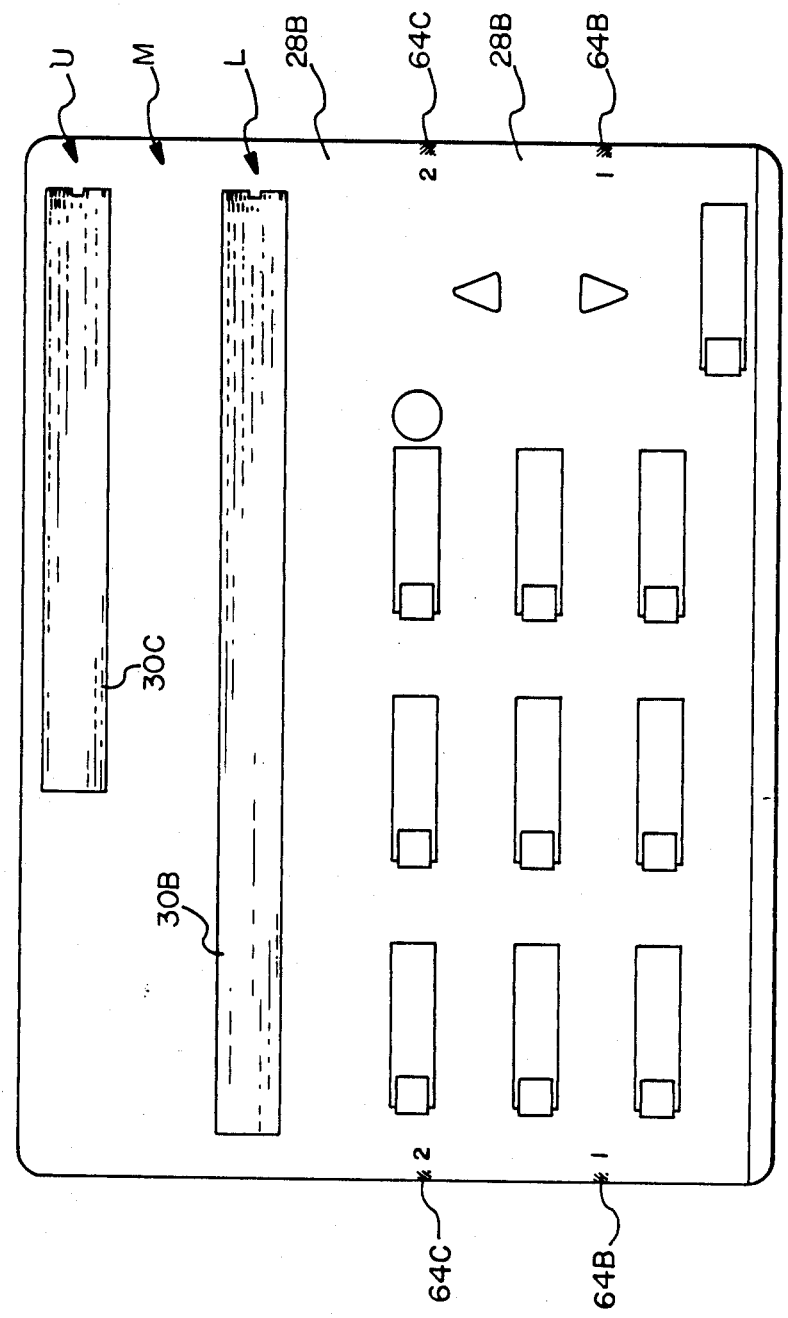
Figure 3C:
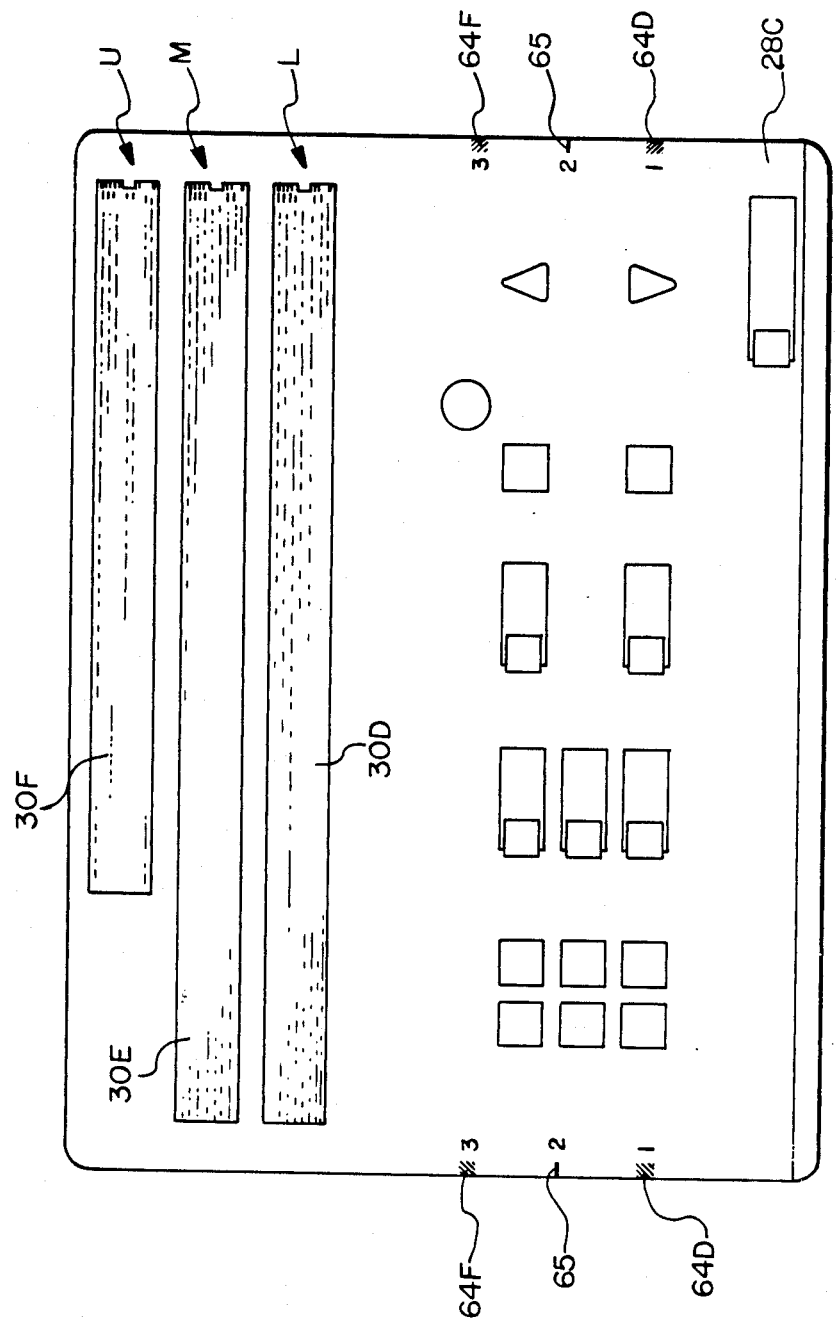

As illustrated in FIGS. 3A–3C, the location of a datastrip or datastrips on an application insert is a function of the number of datastrips on the insert. The location of a datastrip is chosen so that when the last datastrip is positioned relative to the datastrip reader, the touchpad of the application insert overlays the membrane touchpad of appliance 10. As shown, the application insert 28 has a datastrip region for locating three datastrips 30. The region includes an upper location designated U, a middle location designated M, and a lower location designated L. When the application insert (such as insert 28B in FIG. 3B) has two datastrips to be read in sequence, the first datastrip (30B) is located in the L (lower) location and the second or last datastrip (30C) to be read is located in the U location. This is to be compared with the application insert of FIG. 3A wherein the first and only datastrip is located in the U location. When the application insert (such as insert 28C in FIG. 3C) has three datastrips to be read in sequence, the first datastrip (30D) is located in the L location; the second datastrip (30E) is located in the M location; and the third datastrip (30F) is located in the U location.

Figure 4A:
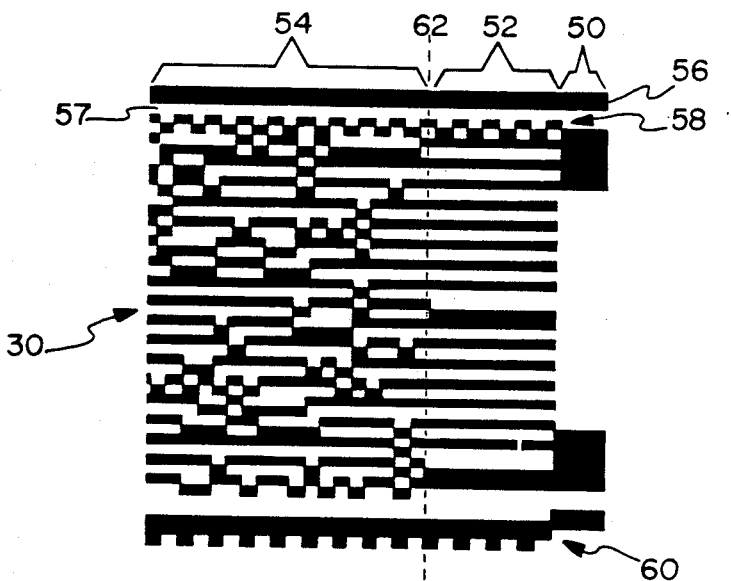
FIGS. 4A and 4B are diagrams illustrating one format of digitally encoded machine readable data forming the datastrips on an application insert.
Figure 4B:
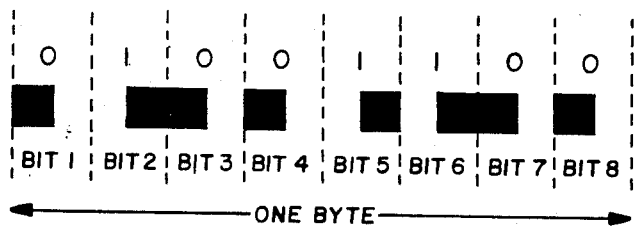

Referring now to FIGS. 4A and 4B, there will be described a preferred format for the optically readable digitally encoded data on the datastrips. This is a specially encoded barcode pattern in which a data bit is defined by dibits, wherein a "zero" is define by sequential black and white squares and a "one" is defined by sequential white and black squares. The encoded digital information is in a plurality of parallel, contiguous lines formed of bytes of information, the bits being of uniform height and width. Associated with the encoded information on the printed datastrip, are printed areas serving to preliminarily align the optical reader with the data lines, to maintain that alignment during reading, and to set the vertical and horizontal rates of scanning.

As shown in the exemplary portion of a datastrip in FIG. 4A, the datastrip 30 is oriented to be read by the reader 34 from right to left. The datastrip 30 includes a header portion including a tilt adjustment section 50 and a vertical synchronization section 52 followed by an encoded information section 54. Running along the top edge of the datastrip is a solid start line 56, one dibit wide. After a one bit space 57, there follows a checkerboard pattern alignment guideline 58, which functions as a tilt control line. Running longitudinally along the lower edge of the datastrip 30 is patterned alignment guideline 60. Alignment guidelines 58 and 60 enable the reader 34 to adjust the angle of scanning relative to a transverse data line 62 to the extent necessary to keep them parallel as the datastrip is read.

Referring now to FIG. 4B, there is shown in greater detail an exemplary byte of dibit encoded digital data. As shown, the byte has the value 01001100. Thus, bits 1, 3, 4, 7, and 8 are "zero" bits and are defined by black followed by white squares. Bits 2, 5, and 6 are "one" bits and are defined by white followed by black squares. The number of bytes in a datastrip may vary, for example, from two to eight bytes and in the example given in FIG. 4A, comprises two bytes, whereas the datastrips illustrated in FIGS. 3A-3C have data lines which are six bytes wide.

A user is guided in orienting an application insert relative to appliance 10, so that (1) the datastrips on the application insert are read by the datastrip reader in the proper sequence, and (2), at the end of the guidance procedure, the touchpad on the application insert in properly positioned over the corresponding touchpad on the appliance. The user is aided during the guidance procedure by guidance marks 64 and alignment marks 65 on the application insert 28 and complementary alignment marks 66 on appliance 10 (see FIG. 2). The user is also aided during the guidance procedure by messages on the display screen 14 of appliance 10. These messages are produced in response to the reading of guidance data contained in each datastrip at the beginning of the encoded information section 54. Such guidance data includes, for example, the number of datastrips on the application insert and the sequence number of the datastrip being read.

Figure 5B:
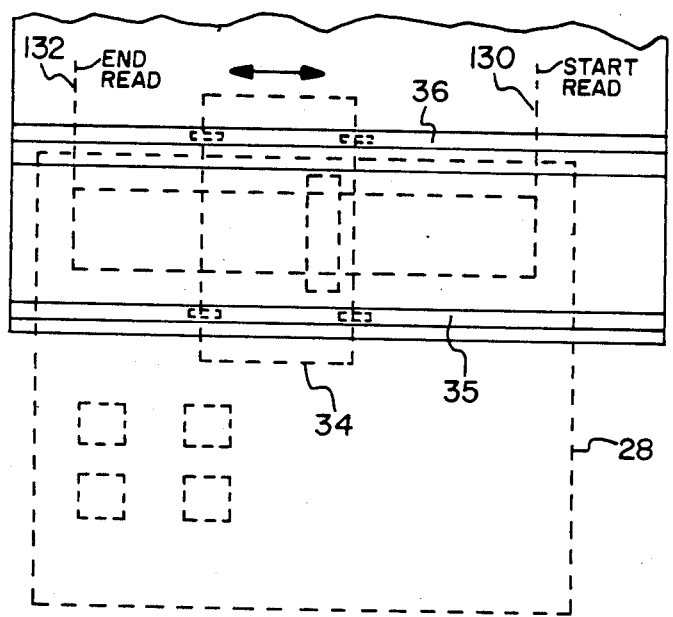

As shown in FIG. 5B, reader 34 starts reading a datastrip at the "start read" position 130. Reader 34 moves along track 35 and 36 from right to left until the "end read" position 132 is reached. At this point, all the data on the datastrip has been read into RAM 48 and reader 34 is moved back to the "start read" position, to be ready to read another datastrip.

Figure 6A:
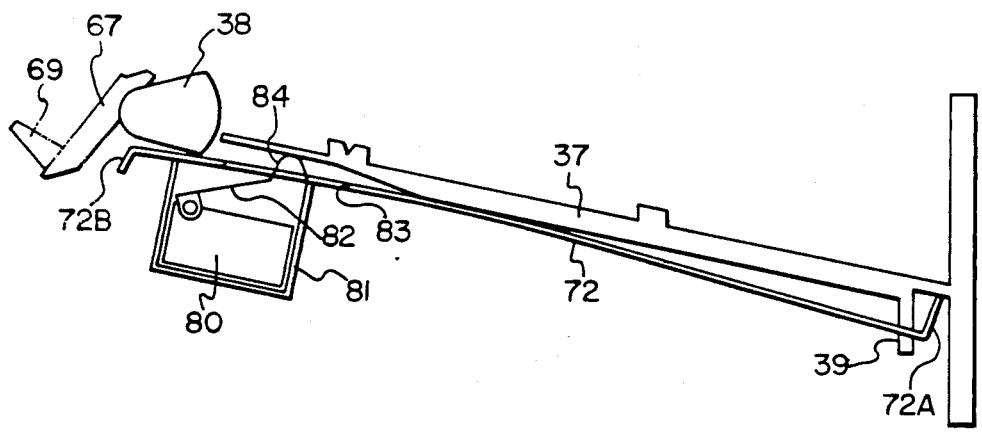
FIGS. 6A–D are diagrammatic views illustrating operation a preferred embodiment of of the present invention.
Figure 6B:
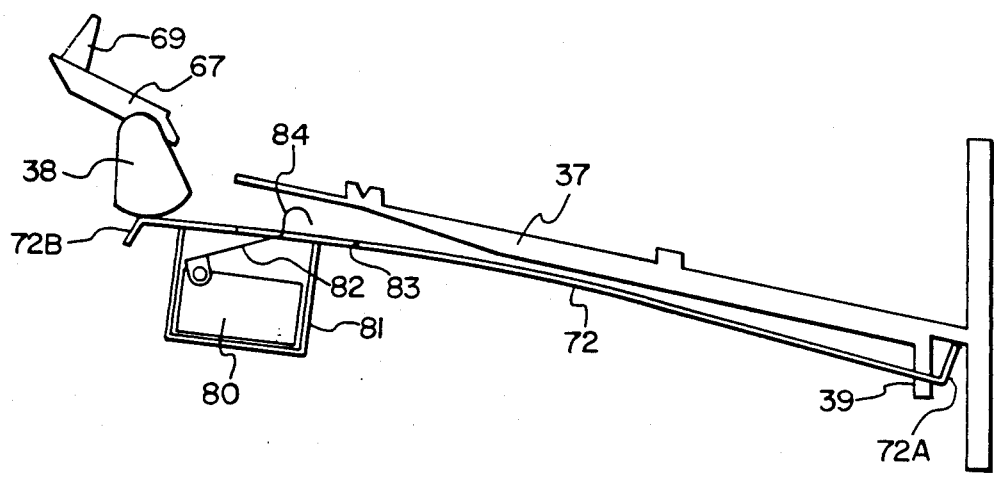
Figure 6C:
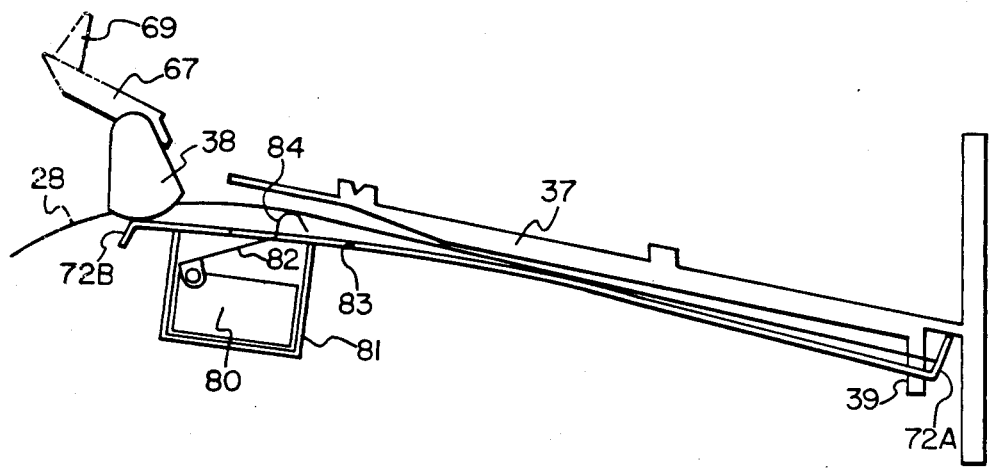
Figure 6D:
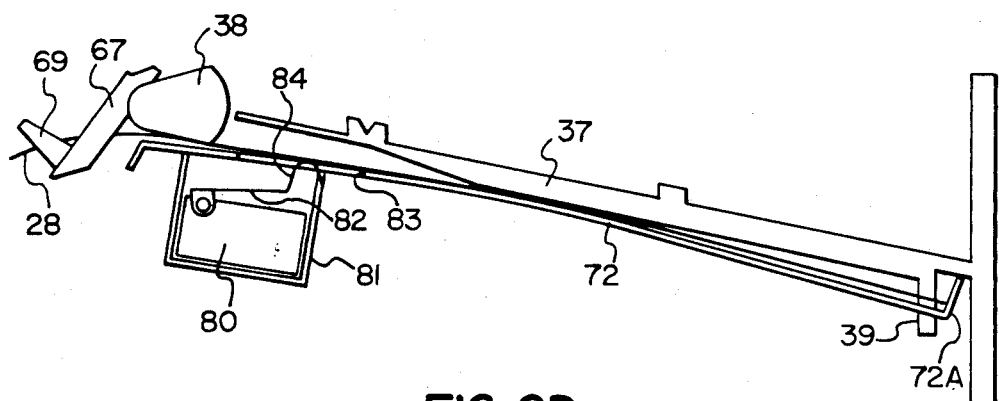

Referring now to FIGS. 6A-6D there will now be described an embodiment of the present invention. As shown, a microswitch 80 is mounted by bracket 81 on pressure platen 72. Switch 80 has a movable actuator 82 which is normally biased through an opening 83 in platen 72. As shown in FIG. 6A, contact 84 of actuator 82 extends above platen 72 when there is no application insert 34 on platen 72 and when door 67 is closed. Thus, microswitch 80 is not actuated. By pushing up on lever 69, door 67 is opened and cam 38 pushes end 72B of platen 72 down (FIG. 6B). In this position, actuator contact 84 of microswitch 80 still extends above platen 82 and microswitch 80 is not actuated. When door 67 is open, an application insert 28 is placed on platen 72 to position a datastrip under reader 34 (FIG. 6C). This is possible because of the space between platen 72 and member 37. The upward bias of actuator 82 is made greater than the downward force exerted on it by the weight of insert 28, so that microswitch 80 is still not actuated.

When door 67 is closed with an application insert 28 positioned on platen 72 (FIG. 6D), cam 38 is moved out of engagement with platen 72. Platen 72 presses insert 28 against member 37. Insert 28 presses against contact 84 to cause actuator 82 to actuate microswitch 80. Actuation of microswitch 80 signals CPU 40 that system operation can commence. Thus, microswitch 80 is only actuated when both door 67 is closed and an application insert 28 is positioned on platen 72.

The invention has been described in detail with particular reference to a preferred embodiment thereof, but it will be understood that variations and modifications can be effected within the spirit and scope of the invention.

What is claimed is:

1. Digital data apparatus comprising:
    a housing having a reader for reading digital data contained in data strips on an application insert;
    a platen mounted within said housing for positioning an application insert relative to said reader, said platen having a free end which is movable between first and second positions;
    a microswitch which is mounted on said platen and which includes an actuator normally biased to engage an application insert positioned onto said platen;
    a door which is mounted in a wall of said housing adjacent to said end of said platen, said door being movable between open and closed positions; and
    means, cooperatively associated with said door and said platen (1) for moving said end of said platen between said first and second positions when said door is moved between said closed and said open positions, so that an application insert may be placed onto said platen through said door for positioning relative to said reader; and (2) for moving said end of said platen between said second and first positions when said door is moved between said open and said closed positions, so that said application insert engages said actuator to actuate said microswitch.

2. The apparatus of claim 1 wherein said reader is mounted on a fixed member which overlies said platen such that when said platen is in said first position, an application insert, placed on said platen, is pressed against said member in the region of said reader to facilitate the reading by said reader of digital data encoded in a datastrip on said application insert.

3. The apparatus of claim 2 wherein said platen is cantilevered against said member, such that said platen end is normally in said first position and wherein said platen moving means includes a cam connected to said door such that (1) when said door is moved between said closed and open positions, said cam engages said platen end to move said end between said first and second positions, and (2) when said door is moved between said open and closed positions, said cam disengages said platen to allow it to move between said second and first positions.

* * * * *